United States Patent
Hardtke

(10) Patent No.: US 7,320,448 B2
(45) Date of Patent: Jan. 22, 2008

(54) PIPE CLIP

(75) Inventor: Hans-Herlof Hardtke, Zeven (DE)

(73) Assignee: Lisega Aktiengesellschaft, Zeven (DE)

( * ) Notice: Subject to any disclaimer, the term of this patent is extended or adjusted under 35 U.S.C. 154(b) by 94 days.

(21) Appl. No.: 11/072,006

(22) Filed: Mar. 4, 2005

(65) Prior Publication Data

US 2005/0285389 A1    Dec. 29, 2005

Related U.S. Application Data

(63) Continuation of application No. PCT/DE03/02851, filed on Aug. 27, 2003.

(30) Foreign Application Priority Data

Sep. 4, 2002   (DE) .......................... 202 14 355 U

(51) Int. Cl.
*F16L 3/00*   (2006.01)
(52) U.S. Cl. ..................... 248/62; 248/74.1; 248/317
(58) Field of Classification Search .................. 285/61;
248/62, 74.1, 74.4, 317, 320, 322, 316.6;
24/20 R, 21; 294/119.2
See application file for complete search history.

(56) References Cited

U.S. PATENT DOCUMENTS

| | | | | |
|---|---|---|---|---|
| 437,482 | A | * | 9/1890 | Cook, Jr. ..................... 248/62 |
| 2,339,564 | A | * | 1/1944 | Goldberg et al. ............. 248/62 |
| 2,835,464 | A | * | 5/1958 | Kolodin ........................ 248/62 |
| 2,938,692 | A | * | 5/1960 | Bosworth et al. .......... 248/68.1 |
| 3,051,424 | A | * | 8/1962 | Duhamel ..................... 248/62 |
| 3,227,406 | A | | 1/1966 | Shelton et al. |
| 3,709,571 | A | * | 1/1973 | Croisant et al. ............. 384/443 |
| 4,413,799 | A | | 11/1983 | Gabriel ......................... 248/59 |
| 4,676,473 | A | * | 6/1987 | Giles .......................... 248/638 |
| 4,858,860 | A | * | 8/1989 | Richards ....................... 248/62 |

(Continued)

FOREIGN PATENT DOCUMENTS

DE          18 51 413          5/1962

(Continued)

*Primary Examiner*—Korie Chan
(74) *Attorney, Agent, or Firm*—Grossman Tucker Perreault & Pfleger, PLLC

(57) ABSTRACT

The invention relates to a pipe clip 1 for mounting pipes and the like, comprising a suspendable upper part 2 and a U-shaped lower part 3, the ends of which can be connected to upper part 2 by means of fastening elements and in which a pipe is mounted. Lower part 3 is manufactured in one piece by deformation of a creep-resistant flat steel bar or strip of sheet metal, where lower part 3 displays a cross-section with at least one wider, plane lateral surface 12, which is located on the inside and on which the pipe to be mounted rests, and upper part 2 displays a holding-down device 4 for holding down the pipe mounted in lower part 3.

Figure 1:
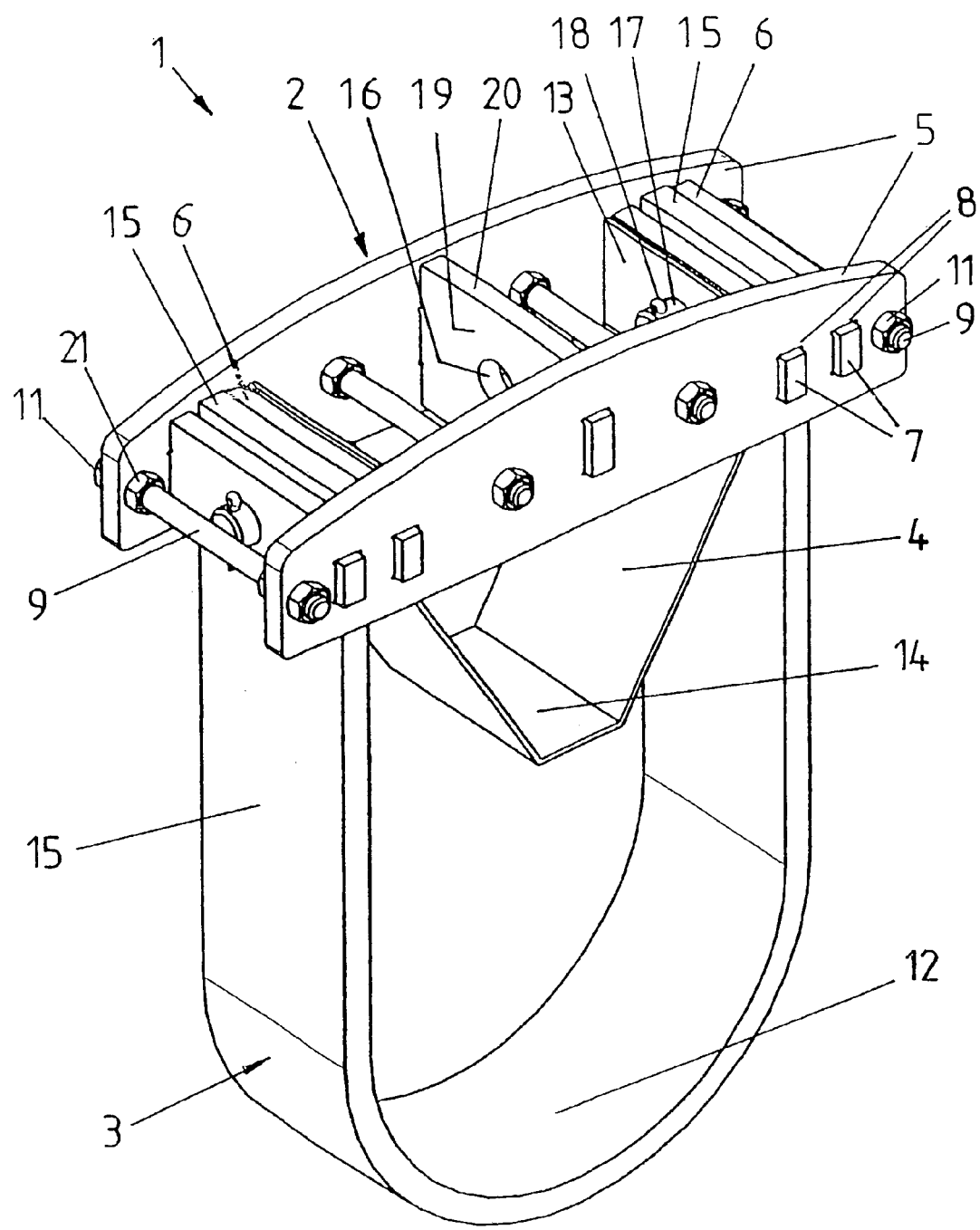

To achieve permanently firm mounting of the pipe that can be mounted in the pipe clip, it is envisaged that the fastening elements, by means of which lower part 3 can be fastened to upper part 2, display drilled holes of equal size through wider lateral surfaces 12 of the leg ends of U-shaped lower part 3 and through larger lateral surfaces 19 of at least two cross-pieces, and at least one bolt 17 with a diameter corresponding to drilled holes 16, where bolt 17 is secured against unintentional loosening.

22 Claims, 2 Drawing Sheets

U.S. PATENT DOCUMENTS

| | | | | |
|---|---|---|---|---|
| 4,930,732 | A | | 6/1990 | Hardtke .................. 248/62 |
| 4,946,117 | A | | 8/1990 | Liesegang ................ 248/65 |
| 5,776,542 | A | * | 7/1998 | Campana ................ 427/250 |
| 6,011,218 | A | * | 1/2000 | Burek et al. ......... 174/40 CC |
| 6,138,960 | A | * | 10/2000 | Carbonare et al. .......... 248/62 |
| 6,783,104 | B1 | * | 8/2004 | Roth .................. 248/230.1 |
| 7,055,223 | B2 | * | 6/2006 | Cassel et al. ............ 24/20 R |
| 2002/0000498 | A1 | * | 1/2002 | Workman ................ 248/62 |

FOREIGN PATENT DOCUMENTS

| | | |
|---|---|---|
| DE | 1 851 413 U1 | 8/1965 |
| DE | 1 575 159 U1 | 1/1970 |
| DE | 15 75 159 | 1/1970 |
| DE | 196 12 583 | 10/1996 |
| DE | 196 12 583 A1 | 10/1996 |
| EP | 0 342 400 | 4/1989 |
| EP | 0 342 414 | 2/1993 |

* cited by examiner

PIPE CLIP

CROSS REFERENCE TO RELATED APPLICATIONS

This application is a continuation of International Application No. PCT/DE03/02851 filed Aug. 27, 2003 designating the United States and claiming priority to German Patent Application No. DE 202 14 355.4 filed Sep. 4, 2002.

The invention relates to a pipe clip for mounting pipes and the like, comprising a suspendable upper part and a U-shaped lower part, the ends of which can be connected to the upper part by means of fastening elements and in which a pipe is mounted, where the lower part is manufactured in one piece by deformation of a creep-resistant flat steel bar or strip of sheet metal, the lower part displays, a cross-section with at least one wider, plane lateral surface, which is located on the inside and on which the pipe to be mounted rests, and the upper part displays a holding-down device for holding down the pipe mounted in the lower part.

Pipe clips are customarily used in pipeline construction to mount a pipe in a suspended or supported position. Their dimensions are essentially determined by the pipe diameter and load, as well as by the medium transported in the pipeline, but they should not be designed too large in order to achieve the necessary load-bearing capacity, since their own weight otherwise becomes excessive and they are difficult to handle.

In hot pipelines, i.e. pipelines for transporting a medium with a high temperature, the mounts or pipe connections are particularly highly stressed owing to the thermal loads occurring. Within this group of components, pipe clips are the most severely stressed, and thus most vulnerable, components in this context, being exposed both to static loads and also to dynamic loads predominantly caused by fluctuations in the thermal expansion of the pipes. Hot pipelines are generally lagged with insulating material. As a result, the pipe clips are difficult to access and hard, or even impossible, to check visually after being put into service. Consequently, it is indispensable that the pipe clips be designed in a manner that guarantees a permanently tight fit of the pipe mounted in the pipe clip.

DE 196 12 583 A1 describes a generic pipe clip. It is seen as being a particular advantage in this context that, for assembly on the pipeline, the upper part and lower part can be inserted into each other by means of expansions and recesses that can be fitted into each other, remaining loose and thus also being separable again. The abutment in this arrangement is provided by the holding-down device, which is necessarily located in a screwed connection permitting radial displacement relative to the pipeline to permit assembly of the pipe clip with inserted pipe and adjustment to the pipe diameter, where the screw is passed through a slot and tightened after adjustment. The disadvantage of this is that the connection can become loose in use, thus enabling radial displacement of the holding-down device, meaning that the pipe mounted therein is no longer mounted firmly in the pipe clip and that there can even be the danger of the lower part and the upper part being separated.

DE 185 14 13 U discloses a similar connection via a slot, involving the same problem as described above.

Publications U.S. Pat. No. 4,413,799 and EP 0 342 400 A disclose pipe clips, whose upper part and lower part, or upper part and holding-down device, are held together by screwed connections, meaning that, in the event of loosening of the connection, a pipe mounted therein no longer sits tightly in the pipe clip.

The object of the invention is to provide a pipe clip that permits a permanently tight fit of a pipe mounted therein.

According to the invention, the object is solved in that the fastening elements, by means of which the lower part can be fastened to the upper part, display drilled holes of equal size through the wider lateral surfaces of the leg ends of the U-shaped lower part and through the larger lateral surfaces of at least two cross-pieces, and at least one bolt with a diameter corresponding to the drilled holes, where the bolt is secured against unintentional loosening.

In this context, the leg ends are inserted into the upper part in such a way that their wider lateral surfaces lie in each case against a larger lateral surface of the two cross-pieces, are aligned to coincide with the drilled holes and connected by the bolt, which is passed through the drilled holes, projects at its free ends on both sides of the connection and is secured against unintentional loosening. This construction is characterised by the fact that it is of particularly simple design and can be assembled easily on-site. Thanks to its smooth surface, the bolt can easily be passed through the drilled holes. This connection is thus based on a bolt that runs parallel to the longitudinal webs over the length of the pipe clip, meaning that no displacement in a direction radial to the pipe can take place and that the mounted pipe is therefore seated tightly in the pipe clip. Moreover, the secured bolted connection cannot be disconnected unintentionally, except by destroying the components of the connection themselves, meaning that a permanently tight fit of the pipe in the pipe clip is guaranteed. Moreover, the bolted connection is simple to manufacture and easily disconnectable, even after extended periods of use, by removing the securing elements in the form of split-pins or the like and withdrawing the bolt from the drilled hole. Furthermore, as described in more detail below, a creep-resistant material that is hard to work by mechanical methods can be considered as the material for use on a hot pipeline, at least for the lower part. For the bolted connection, a drilled hole merely needs to be made in the leg ends of the lower part made of the creep-resistant material that is hard to work by mechanical methods, in which context the microstructure of the material moreover remains largely unaffected.

The one-piece design of the lower part advantageously reduces the manufacturing and assembly effort. Of necessity, creep-resistant steel grades are used for the sections of the pipe clip in contact with the pipe on hot pipelines with operating temperatures in excess of 600 C. When quenched and tempered, these materials display the required strength values and are hard to work by mechanical methods. However, thermal working, especially welding, alters the microstructure as a result of the locally high heat input into the material in the welding area, in such a way that it has to undergo renewed, complex heat treatment, in which context the original strength, toughness and creep resistance values, and thus load-bearing capacities, can hardly be achieved again, meaning that the welding area, at least, can constitute a weak point. For this reason, the lower part of the object according to the invention is advantageously manufactured in one piece without welding, or by other joining methods, and, as described in more detail below, in a manner that spares the microstructure to the greatest possible extent.

The lower part displays a cross-section with at least one wider, plane lateral surface, as a result of which the pipe mounted against it advantageously displays a correspondingly wide contact surface that spares the pipe. In addition, since the cross-sectional area is larger compared to a round cross-section, the tensile stresses prevailing in the cross-section are reduced, the material thus being exposed to lower stresses, meaning that higher load-bearing capacities can be achieved.

Moreover, the pipe clip displays a holding-down device for holding down the pipe mounted in the lower part. As a result, the hot pipeline is advantageously kept at a distance from the upper part that can be set via a geometry of the holding-down device yet to be described, meaning that the upper part is exposed to less thermal stress and can therefore be made of a less creep-resistant, and thus less expensive and more easily workable, material. Furthermore, the positioning security of the holding-down device on the pipe can be set via the choice of material and the geometry of the holding-down device.

The lower part is preferably made of a creep-resistant chromium molybdenum steel. Particularly preferably, the lower part is made of X 10 CrMoVNb 9-1, which is particularly resistant to creep and high-temperature oxidation and essentially the same as a customary material for hot pipelines.

In a preferred embodiment, the lower part is essentially made of the same material as the pipe mounted in it. Thanks to the coefficients of expansion being identical, this advantageously results in similar expansion properties of the lower part and the pipe section mounted in it. Furthermore, this prevents the possibility of the corrosion that occurs upon contact between two electrogalvanically dissimilar metals.

The microstructure of the lower part preferably displays anisotropy of deformation, in which context its microstructure is deformed more strongly perpendicularly to the cross-sectional plane than in the cross-sectional plane. Workpieces like the lower part are customarily taken from rolled plate with corresponding anisotropies of deformation in the longitudinal direction, these being exploited in this case in that the longitudinal direction of the lower part, or of the flat steel bar, corresponds to the direction of rolling. This unequal deformation has the advantageous effect that the tensile strength perpendicular to the cross-sectional area, and the notched impact toughness in the cross-sectional area, are increased, as a result of which the creep strength of the lower part can also be increased accordingly.

The lower part is preferably manufactured by cold forming. This advantageously largely preserves the quenched-and-tempered microstructure, meaning that, given correspondingly small degrees of deformation, subsequent quenching and tempering is not necessary. According to common standards, the corresponding, maximum degree of deformation for material X 10 CrMoVNb 9-1, for example, is in the region of 5%.

Particularly preferably, the lower part is of U-shaped design, where, expediently and advantageously, the radius of the semicircle in the U-shape corresponds to the radius of the cross-section of the pipe mounted therein. In addition, the U-shape is advantageously produced uniformly with particularly small degrees of deformation. As a result of this, the quenched-and-tempered microstructure can remain so undisturbed that only stress-relief annealing is necessary after deformation.

In a preferred embodiment, the lower part displays an essentially rectangular cross-section.

On the one hand, this simplifies manufacture, since the cross-sectional shape is customarily already included in flat steel bars or rolled plate. Furthermore, compared to a dome-shaped cross-section, for example, this achieves the maximum cross-sectional area for a given width and thickness, which can be subjected to higher forces.

In one embodiment, the upper part displays at least two longitudinal webs, a distance apart, and at least two cross-pieces, a distance apart, each of which has one larger lateral surface, where the cross-pieces are arranged essentially at right angles to the longitudinal webs and between the longitudinal webs. The simple and expedient design of the upper part is advantageous in this context.

In a further preferred design, the longitudinal webs and cross-pieces are manufactured as individual plate components, which can be assembled in form-fitting manner, remaining loose, and can be fixed in place via connecting elements. This greatly simplifies the manufacture of the upper part in comparison with a welded construction, for example, since the individual parts can be manufactured from a plate and pre-assembled on-site, for example.

In a particularly preferred embodiment, the face surfaces of the cross-pieces each display at least one extension, which engages a corresponding recess in one of the longitudinal webs in the assembled upper part. As a result of this, the individual plate components are particularly easy to assemble or connect. In this context, the extension is preferably integrally connected to the respective cross-piece.

Even more preferred is an embodiment of the invention in which the extension displays a rectangular cross-section with a thickness equal to the thickness of the cross-piece, where the extension forms at least two common lateral surfaces with the cross-piece, and the extension just projects beyond the outer lateral surface of the longitudinal web. This further simplifies manufacture of the cross-piece, and thus of the pipe clip, since the extension can be cut directly from a plate forming the cross-piece.

Particularly preferably, the leg ends are each located between two cross-pieces and essentially adjacent to them, in which context slight play can occur between the leg ends and the cross-pieces in order to facilitate assembly. Since the leg ends are each adjacent to a cross-piece on both sides, the lower part is mounted in particularly stable fashion and protected against torsion.

In a particularly preferred development of the invention, the two leg ends are connected to the cross-pieces by one bolt each. As a result, the leg ends can be fastened individually to the upper part by a bolt, this advantageously leaving the middle of the upper part free and facilitating the assembly of the fastener.

The bolts are preferably secured by means of locking split-pins, preferably at the free bolt ends, said split-pins being passed through corresponding holes. This has the advantage that, if necessary, the locking split-pins can be removed again, and thus also the bolt.

In a preferred embodiment, the fastening elements, by means of which the lower part can be fastened to the upper part, display drilled holes of equal size through the wider lateral surfaces of the leg ends of the U-shaped lower part and through the larger lateral surfaces of at least two cross-pieces of the upper part, and at least one bolt with a diameter corresponding to the drilled holes, where the bolt is secured against unintentional loosening.

In this context, the leg ends are inserted into the upper part in such a way that their wider lateral surfaces lie in each case against a larger lateral surface of the two cross-pieces, are aligned to coincide with the drilled holes and connected by the bolt, which is passed through the drilled holes, projects at its free ends on both sides of the connection and is secured against unintentional loosening. This construction is characterised by the fact that it is of particularly simple design and can be assembled easily on-site. Thanks to its smooth surface, the bolt can easily be passed through the drilled holes. Furthermore, this kind of connection requires merely drilled holes in the leg ends of the lower part which is made of the creep-resistant material which can hardly be worked, the microstructure of the material remaining widely uninfluenced. This connection is thus based on a bolt that runs parallel to the longitudinal webs over the length of the pipe clip, meaning that no displacement in a direction radial to the pipe can take place and that the mounted pipe is therefore seated tightly in the pipe clip. Moreover, the secured bolted connection cannot be disconnected unintentionally, except by destroying the components of the connection themselves, meaning that a permanently tight fit of the pipe in the pipe clip is guaranteed. Moreover, the bolted connection is simple to manufacture and easily disconnectable, even after extended periods of use, by removing the securing elements in the form of split-pins or the like and withdrawing the bolt from the drilled hole. Furthermore, as described in more detail below, a creep-resistant material that is hard to work by mechanical methods can be considered as the material for use on a hot pipeline, at least for the lower part. For the bolted connection, a drilled hole merely needs to be made in the leg ends of the lower part made of the creep-resistant material that is hard to work by mechanical methods, in which context the microstructure of the material moreover remains largely unaffected.

Particularly preferably, the leg ends are each located between two cross-pieces and essentially adjacent to them, in which context slight play can occur between the leg ends and the cross-pieces in order to facilitate assembly. Since the leg ends are each adjacent to a cross-piece on both sides, the lower part is mounted in particularly stable fashion and protected against torsion.

In a particularly preferred development of the invention, the two leg ends are connected to the cross-pieces by one bolt each. As a result, the leg ends can be fastened individually to the upper part by a bolt, this advantageously leaving the middle of the upper part free and facilitating the assembly of the fastener.

The bolts are preferably secured by means of locking split-pins, preferably at the free bolt ends, said split-pins being passed through corresponding holes. This has the advantage that, if necessary, the locking split-pins can be removed again, and thus also the bolt.

Fastening of the lower part to the upper part by means of at least one bolt was described above. However, other embodiments are also conceivable, such as bending over of the leg ends to produce small projections, which then rest on the upper part, e.g. from above on the cross-pieces, and are pressed against the upper part by the dead weight of the pipe, as well as by the holding-down device resting against the pipe.

In the invention, the holding-down device is preferably made of strip steel or a strip of sheet metal with an essentially rectangular cross-section. This permits low-cost manufacture, since commercial fabricated materials can be used, as also for the other parts of the pipe clip.

The holding-down device preferably displays a profile that runs in one plane and is bent in mirror-symmetrical fashion.

In a further preferred embodiment, the holding-down device displays an open shape, the free ends of which run in essentially the same direction and are connected to the upper part, while the area of the holding-down device in the middle of its shape rests against the pipe mounted in the lower part. Thanks to the mirror-symmetrical design, forces can be transmitted uniformly from the middle of the shape to the free ends of the holding-down device and thus further into the supports of the holding-down device.

In a particularly preferred embodiment, the holding-down device displays a U-shape, which is open towards the upper part, angular, bent four times and has a middle side that runs essentially parallel to the longitudinal webs and rests against the pipe. In the area where the holding-down device rests against the pipe, the holding-down device is exposed to particularly great thermal stress as a result of the thermal conduction occurring there. If, as in this embodiment, the holding-down device acts on the pipe in a very narrow area, this area exposed to particularly great thermal risk is advantageously minimised. In this context, the middle side is preferably designed larger than necessary for forming a contact surface with the pipe. This advantageously makes it possible to compensate for inaccuracies resulting from assembly and/or production, which would result in displacement of the middle side from the centre. Furthermore, the holding-down device can, similarly to a leaf spring, give way to or counteract expansion of the pipe section in elastic or elastic-plastic manner to a small extent that can be set by way of the dimensions and the material used. Advantageously, a bent U-shape of this kind can be obtained with little effort by simply bending the strip steel. Naturally, other possible polygonal shapes of the holding-down device are also encompassed by this invention, where an odd number of sides is always preferred.

In a further, special embodiment, the holding-down device displays a middle area that is adapted to the cross-section of the pipe and arched towards the upper part. As a result of this, a particularly tight fit of the holding-down device on the pipe is advantageously achieved.

In a further, advantageous embodiment, the holding-down device displays the shape of a circle or oval that is open towards the upper part. These shapes, which form a kind of semicircular arch structure, advantageously permit the transmission of particularly great forces.

The free leg ends of the holding-down device preferably display drilled holes, through which the holding-down device can be fastened to the upper part. Particularly preferably, these drilled holes correspond to the drilled holes of the lower part and those of the cross-pieces. In this context, these drilled holes are expediently arranged in such a way that the leg ends of the holding-down device and of the lower part can in each case be fastened to the cross-pieces together.

The connecting elements, by means of which the assembled longitudinal webs and cross-pieces are held together in the upper part, remaining loose, preferably display at least one steel rod with a thread on each of its free ends, where the steel rod is arranged parallel to the cross-pieces and running through corresponding holes in the larger lateral surfaces of the longitudinal webs, projects beyond the longitudinal webs at its free ends and can be screwed down from the outside with screw nuts. In this context, the screw nuts can be secured against unintentional loosening by means of subsequent locknuts. This makes it possible to achieve a positive and non-positive connection.

In a particularly preferred embodiment, at least one counternut for securing the screwed connection can additionally be fitted against the inner side of the longitudinal webs towards both ends of the steel rod. As a result of this and if so desired, slight play can additionally be created between the connected longitudinal webs and cross-pieces, said play being adjustable by means of the screw nuts located on the inside. This play can, however, also be completely eliminated by screwing the longitudinal webs to the cross-pieces appropriately. The screw nuts can additionally be fixed in place in their assigned positions by caulking the screwed connections.

In the area in which the bolt is located, the steel rods preferably run perpendicularly to the bolt and below and/or above the bolt. In this context, it is expedient, in order to produce uniform stress conditions, to arrange the steel rods in an alternating sequence and, referred to the middle of the upper part, in a symmetrical sequence below and above the bolt.

In a special embodiment, at least one steel rod is passed through the bolt to secure it. As a result, securing of the bolt and connection of the longitudinal webs and the cross-pieces can advantageously be accomplished in one work step. In this context, at least one steel rod with this dual function is necessary to secure a bolt.

The upper part preferably displays at least one retaining strap designed as a cross-piece, on which the pipe clip can be suspended by means of a suspension device, where the retaining strap should expediently be located in the middle of the upper part. The suspension device can act on the retaining strap from above in this context. Particularly preferably, the retaining strap displays at least one drilled hole through the middle of its larger lateral surface to serve as the connecting point to the suspension device.

In a further embodiment, the upper part displays two retaining straps, which are located on both transverse sides of the upper part. Due to this arrangement, at least one suspension device can advantageously act on the cross-pieces, from above and also from the side.

Additionally conceivable is an embodiment in which the upper part displays at least one longitudinal web, on which the pipe clip can be suspended by means of a suspension device.

In a preferred embodiment, the lower part is fastened to the upper part in replaceable fashion. Particularly preferably, both parts, the lower part and the holding-down device, are attached to the upper part in replaceable fashion in the manner described above, in that the at least one bolt is removable. For easier replacement, it is expedient in this context for the steel rods for connecting the individual plate components to be arranged in such a way that they do not impede displacement of the bolt for disconnection of the lower part and/or the holding-down device. This advantageously makes it possible to replace damaged lower parts, for example. Furthermore, the pipe clip can be pre-assembled, apart from the lower part and the holding-down device, and finally assembled on-site on the pipe to be mounted.

Also conceivable in this context is a design of the upper part that permits the fastening or replacement of different designs of lower parts and/or holding-down devices.

The object according to the invention is described in more detail below on the basis of a practical example and an associated drawing. The Figures show the following:

FIG. 1: A perspective top view of a pipe clip, and

Figure 2:
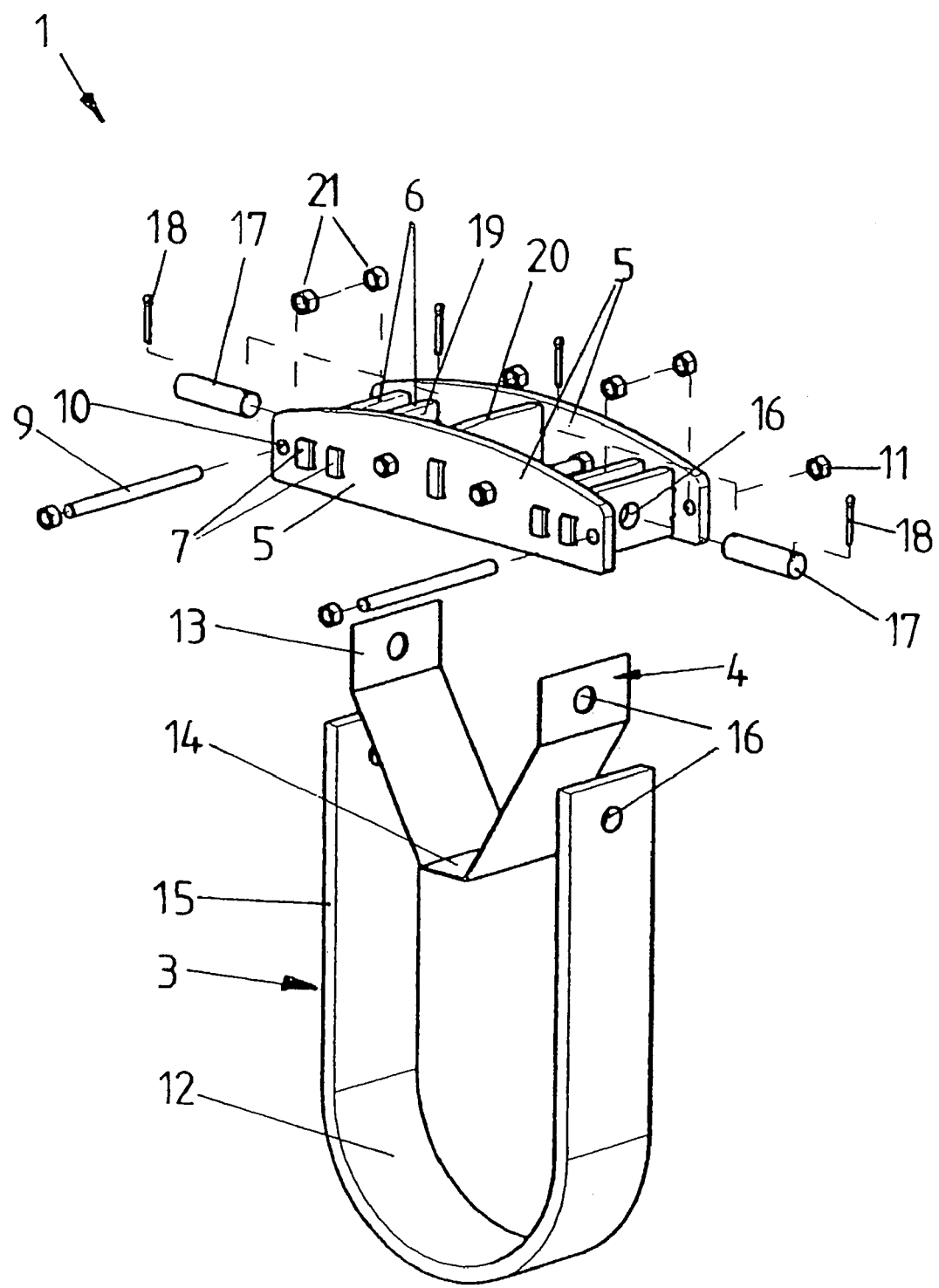

FIG. 2: A perspective top view of the pipe clip with partly pre-assembled upper part, where the remaining, unassembled parts of the pipe clip are arranged about the pre-assembled upper part in the form of an exploded view.

FIG. 1 shows a perspective top view of a pipe clip 1 with an upper part 2 and a lower part 3. Upper part 2 essentially comprises a holding-down device 4 and individual, loosely connectable plate components, i.e. two longitudinal webs 5, four cross-pieces 6 and a retaining strap 20, designed as a cross-piece, where the ends of cross-pieces 6 and retaining strap 20 each display an extension 7 having a rectangular cross-section and the same thickness as cross-pieces 6, 20. In this context, extension 7 engages the respective, corresponding recess 8 in longitudinal web 5.

The plate components, which are inserted into each other and remain loose, are held together to form a plate system by means of steel rods 9, which are spaced apart from each other and have screw threads at both ends, where the threaded ends are passed through corresponding holes 10 in longitudinal webs 5, provided with distance-maintaining and locking counternuts 21, and screwed down.

In the practical example, lower part 3 is made of X 10 CrMoVNb 9-1. In this context, other materials satisfying the respective strength requirements are, of course, also conceivable.

Lower part 3 displays a rectangular cross-section, where one of the two wider lateral surfaces 12 faces inwards and serves as a contact surface for a pipe not shown here. Of course, other cross-sectional shapes are also conceivable, although they should provide a contact surface of similar width for mounting the pipe. Bent cold into a U-shape from a flat steel bar or strip of sheet metal, lower part 3 displays a simple geometry that can advantageously be produced with uniform, small degrees of deformation in such a way that renewed quenching and tempering of the material is not necessary, but perhaps just stress-relief annealing.

Strip-shaped holding-down device 4 displays the profile of a U-shape, which is open towards upper part 2, angular, bent four times and has a middle side 14 that runs in one plane and is mirror-symmetrical, where holding-down device 4 engages the plate system with both legs 13, parallel to cross-pieces 6, and rests with its middle side 14 against the pipe not shown here.

In the same way as holding-down device 4, legs 15 of lower part 3 engage the plate system, where larger lateral surfaces 19 of cross-pieces 6 in each case rest against wider lateral surfaces 12 of legs 15. Cross-pieces 6 and the ends of legs 15 of lower part 3 and of holding-down device 4 each display drilled holes 16 of equal size in the middle, which are aligned to coincide with each other and form a system, and through which bolt 17 is passed and secured with split-pins 18 in such a way that, from the outside to the inside, the sequence cross-piece 6/leg end 15 of lower part 3/cross-piece 6/leg end 13 of holding-down device 4 is obtained on both sides of upper part 2. The fact that lower part 3 is flanked on both sides by cross-pieces 6 results in suspension that is as gentle as possible on lower part 3, and stable.

Instead of the embodiment illustrated here, with two bolts 18, it is also possible, but not shown here, to use just one bolt that runs over the length of the upper part and via which the lower part and/or the holding-down device are connected to the upper part. Also conceivable is individual suspension of the leg ends of the holding-down device and of the lower part with one bolt each.

Other forms of suspension of the lower part are conceivable, but not shown here. For example, instead of the central drilled hole, the cross-pieces can display a recess at roughly the same height on both sides, through each of which a bolt can be passed. In this context, these recesses can advantageously and expediently be made in the cross-pieces by plasma cutting.

FIG. 2 shows pipe clip 1 in pre-assembled condition, in which pipe clip 1 can advantageously be finally assembled on-site. In this context, the as yet unassembled parts, i.e. lower part 3, outer steel rods 9, holding-down device 4 and fastening bolts 17 with associated locking split-pins 18, are illustrated in the form of an exploded view in FIG. 2.

Retaining strap 20, located in the middle of upper part 2, serves as a fastening point for a suspension device not shown here, which can act on drilled hole 16. For reasons of simplified manufacture of pipe clip 1, drilled hole 16 through larger lateral surface 19 of the cross-piece displays the same diameter as the remaining drilled holes 16 in lower part 3, holding-down device 4 and the other cross-pieces 6.

The fastening point, which takes the form of drilled hole 16 in this instance, can, of course, also be designed in a different form adapted to the respective suspension.

Furthermore, instead of one retaining strap, two can be located in the middle of the upper part as cross-pieces, between which a further bracket, shackle, eye or the like is provided for suspending the clip, which can be connected by a common bolt, much as with the suspension of the lower part on the upper part described above.

Deviating from the illustration, the thickness of the cross-piece designed as a retaining strap can also be designed to be greater than that of the remaining cross-pieces in order to increase the load-bearing capacity.

In the practical example illustrated in FIGS. 1 and 2, the two outer steel rods 9 are located at the height of fastening bolt 17. As a result, following final assembly of pipe clip 1, replacement of lower part 3 and/or holding-down device 4 is only possible after removal of the outer steel rods 9, by displacing the fastening bolt 17 towards the outside.

Conceivable, but not shown here, is a construction according to which the outer steel rods and/or the inner steel rods are located at a higher or lower level than the fastening bolts, meaning that the fastening bolts can, after their locking split-pins have been removed, be extracted towards the outside and/or the inside, this permitting easier replacement of the lower part and/or the holding-down device.

LIST OF REFERENCE NUMBERS

1 Pipe clip
2 Upper part
3 Lower part
4 Holding-down device
5 Longitudinal web
6 Cross-piece
7 Extension
8 Recess
9 Steel rod
10 Hole
11 Screw nut
12 Lateral surface
13 Leg
14 Middle side
15 Leg
16 Drilled hole
17 Bolt
18 Split-pin
19 Lateral surface
20 Retaining strap
21 Counternut

The invention claimed is:

1. Pipe clip for mounting pipes, comprising:
   a suspendable upper part including a plurality of cross-pieces having a lateral surface and
   a U-shaped lower part, having legs the ends of which can be connected to the upper part by means of fastening elements and in which a pipe is mounted, where the lower part comprises a one piece creep-resistant flat steel bar or strip of sheet metal, and where the lower part has a cross-section with at least one wide plane lateral surface which is located on the inside and on which the pipe to be mounted rests, and the upper part includes a holding-down device for holding down the pipe mounted in the lower part,
   characterised in that the fastening elements, by means of which the lower part can be fastened to the upper part, include drilled holes of equal size through the leg ends of the U-shaped lower part and through lateral surfaces of at least two cross-pieces of the upper part, include at least one bolt with a diameter corresponding to the drilled holes, where the bolt is secured against unintentional loosening
   further characterised in that the upper part displays at least two longitudinal webs, a distance apart, and at least two of said plurality of cross-pieces, a distance apart, each of said at least two cross-pieces having a lateral surface, where the cross-pieces are arranged essentially at right angles to the longitudinal webs and between the longitudinal webs.

2. Pipe clip according to claim 1, characterised in that the lower part is made of a creep-resistant chromium molybdenum steel.

3. Pipe clip according to claim 2, characterised in that the lower part is made of X 10 CrMoVNb 9-1.

4. Pipe clip according to claim 1, characterised in that the lower part is essentially made of the same material as the pipe mounted in it.

5. Pipe clip according to claim 1, characterised in that the lower part is manufactured by cold forming.

6. Pipe clip according to claim 1, characterised in that the lower part displays an essentially rectangular cross-section.

7. Pipe clip according to claim 1, characterised in that the longitudinal webs and cross-pieces are manufactured as individual plate components, which can be assembled in form-fitting manner, remaining loose, and can be fixed in place via connecting elements.

8. Pipe clip according to claim 7, characterised in that the face surfaces of the cross-pieces each display at least one extension, which engages a corresponding recess in one of the longitudinal webs in the assembled upper part.

9. Pipe clip according to claim 8, characterised in that the extension displays a rectangular cross-section with a thickness equal to the thickness of the cross-piece, where the extension forms at least two common lateral surfaces with the cross-piece, and in that the extension just projects beyond the outer lateral surface of the longitudinal web.

10. Pipe clip according to claim 1, characterised in that the leg ends of the lower part are each located between two cross-pieces and essentially rest against them.

11. Pipe clip according to claim 9, characterised in that the leg ends of the lower part are connected to the cross-pieces by said at least one bolt.

12. Pipe clip according to claim 11, characterised in that said at least one bolt is secured by at least two split-pins.

13. Pipe clip according to claim 1, characterised in that the holding-down device is made of strip steel with an essentially rectangular cross-section.

14. Pipe clip according to claim 1, characterised in that the holding-down device displays a profile that runs in one plane and is bent in mirror-symmetrical fashion.

15. Pipe clip according to claim 14, characterised in that the holding-down device displays an open shape, the free ends of which run in essentially the same direction and are connected to the upper part, while the area of the holding-down device in the middle of its shape rests against the pipe mounted in the lower part.

16. Pipe clip according to claim 15, characterised in that the holding-down device displays a U-shape, which is open towards the upper part, angular, bent four times and has a middle area that runs parallel to the longitudinal webs and rests against the pipe.

17. Pipe clip according to claim 15, characterised in that the holding-down device displays a middle area that is adapted to the cross-section of the pipe and arched towards the upper part.

18. Pipe clip according to claim 14, characterised in that the free ends of the holding-down device display drilled holes, through which the holding-down device can be fastened to the upper part.

19. Pipe clip according to claim 18, characterised in that the drilled holes correspond to the drilled holes of the lower part and those of the cross-pieces, and in that the free ends of the holding-down device and of the lower part can in each case be fastened to the cross-pieces together.

20. Pipe clip according to claim 7, characterised in that the connecting elements include at least one steel rod with a thread on each of its free ends, where the at least one steel rod is arranged parallel to the cross-pieces and running through corresponding holes in the larger lateral surfaces of the longitudinal webs, the at least one steel rod projecting beyond the longitudinal webs at its free ends, and the at least one steel rod screwed down from the outside with screw nuts.

21. Pipe clip according to claim 20, characterised in that at least one counternut for securing the screwed connection can additionally be fitted against the inner side of the longitudinal webs towards both ends of the steel rod.

22. Pipe clip according to claim 20, characterised in that said at least one steel rod runs perpendicularly to said bolt and below or above the bolt.

\* \* \* \* \*